United States Patent [19]

Akutsu

[11] 4,293,520
[45] Oct. 6, 1981

[54] PROCESS FOR MOLDING PARISON FOR MAKING STRETCH MOLDED BOTTLE

[75] Inventor: Masao Akutsu, Tokyo, Japan

[73] Assignee: Yoshino Kogyosho Co., Ltd., Tokyo, Japan

[21] Appl. No.: 76,750

[22] Filed: Sep. 18, 1979

[51] Int. Cl.³ .................. B29C 17/04; B29C 17/07; B29C 17/10; B29D 23/02
[52] U.S. Cl. .................. 264/513; 264/516; 264/535; 264/544; 264/553; 264/138; 264/250; 264/259
[58] Field of Search .......... 264/513, 522, 535, 544, 264/548, 553, 554, 259, 265, 291, 292, 537, 538, 512, 516, 526, 138, 250

[56] References Cited

U.S. PATENT DOCUMENTS

| | | | |
|---|---|---|---|
| 2,926,385 | 3/1960 | Willson, Jr. ................. | 264/548 |
| 3,082,482 | 3/1963 | Gauut ........................ | 264/553 |
| 3,277,224 | 10/1966 | Whiteford .................. | 264/291 X |
| 3,733,309 | 5/1973 | Wyeth et al. ............... | 215/1 C X |
| 3,739,052 | 6/1973 | Ayres et al. ................ | 264/553 X |
| 3,900,120 | 8/1975 | Sincock ..................... | 215/1 C |
| 3,947,205 | 3/1976 | Edwards .................... | 264/535 X |
| 4,118,454 | 10/1978 | Miki et al. .................. | 264/291 X |
| 4,122,138 | 10/1978 | Cleereman et al. .......... | 264/535 X |

Primary Examiner—Jan H. Silbaugh
Attorney, Agent, or Firm—Fidelman, Wolffe & Waldron

[57] ABSTRACT

One disadvantage of a biaxially stretched, blow molded bottle of a saturated polyester resin, particularly polyethylene terephthalate, presenting many excellent features and physical properties, lies in its neck portion which is not subjected to stretching during the molding of the bottle, but which is inferior to its body portion in such physical properties and features. This disadvantage is eliminated by molding at least the neck portion of a parison for such a bottle from a biaxially stretched plate of the resinous material from which the bottle is molded, so that both the neck and body portions of the bottle are composed of the duly biaxially stretched material.

2 Claims, 10 Drawing Figures

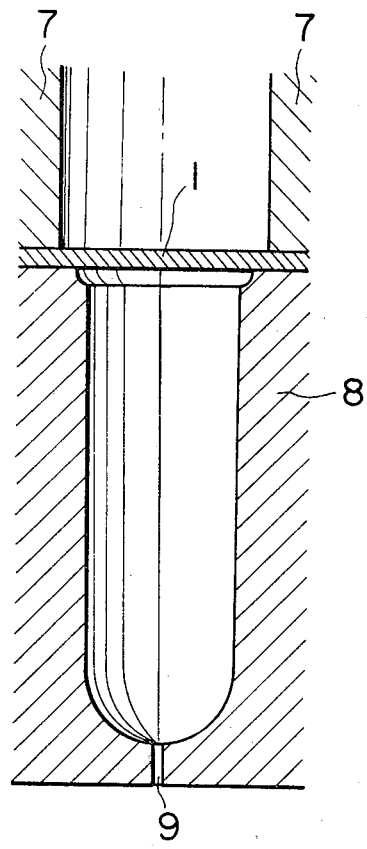
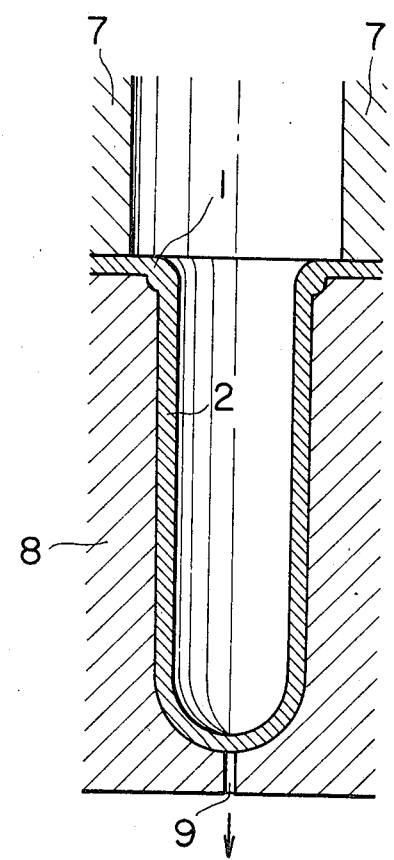

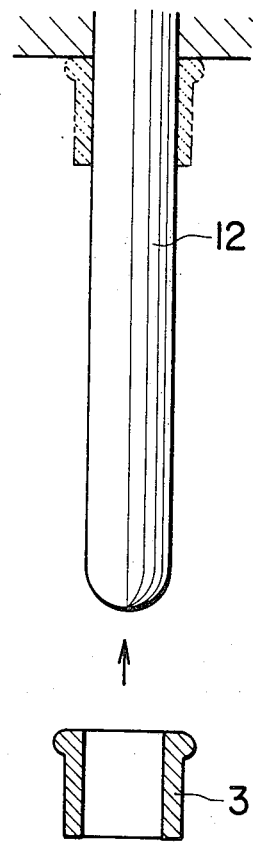
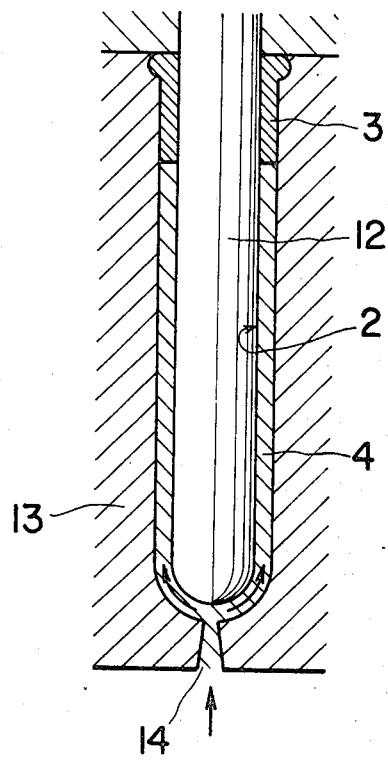
Fig. 9
Fig. 10

PROCESS FOR MOLDING PARISON FOR MAKING STRETCH MOLDED BOTTLE

This invention relates to a process for molding a bottomed cylindrical parison for making a biaxially stretched, blow molded bottle of a saturated polyester resin, particularly polyethylene terephthalate.

A saturated polyester resin, particularly polyethylene terephthalate (representing the saturated polyester resins throughout this specification), is now in use for a variety of applications by virtue of its excellent physical properties and durability. Almost all of the excellent physical properties and durability of polyethylene terephthalate become evident only when the resin is stretch molded into a particular product. Therefore, when a bottle-like product is to be molded from polyethylene terephthalate, it is usual to use the injection-blow molding process in which a cylindrical parison having a closed bottom is just injection molded and then blow molded under stretching into a bottle.

This injection-blow molding process is the most effective means for stretch molding a bottle-like product, and ensures the full stretching of the body of the molded bottle. But the neck of the bottle is not stretched during the blow molding operation, because it serves as a means for mounting the parison to a metallic mold. There undesirably results a bottle having a fully stretched body, but an unstretched neck.

Thus, while the excellent physical properties and durability of the polyethylene terephthalate from which the bottle is molded fully manifest themselves in its duly stretched body, the neck cannot fully benefit from such excellent physical properties and durability.

Accordingly, the bottle obtained has different physical properties and durability between its neck and body. If such a bottle is used to hold an alcohol having a high concentration, its neck is adversely effected by the alcohol, while the body is not. The alcohol penetrates into the neck material and whitens it. The neck becomes mechanically brittle. Many fine cracks are formed in the neck and markedly reduce its sealing effect.

The simplest way of eliminating this drawback is to have the neck, as well as the body, undergo stretching when the bottle is molded. It is, however, impossible to stretch the body and the neck simultaneously during the blow molding operation, and the stretching of the neck must be carried out in a separate process independently of the molding of the body.

No satisfactory method is, however, known for the stretch molding of the neck which is very difficult because of a number of factors such as the position of the neck relative to the body, the amount of stretching, the dimensional accuracy required and the mechanical strength required for maintaining a firm connection with a cap.

The invention is characterized by performing the impact or vacuum molding of at least the neck of a parison, rather than injection molding, so as to accomplish the biaxial stretching of the neck when the parison is formed.

It is, therefore, an object of this invention to provide a bottle molded by the biaxial stretching of its entire material.

It is another object of this invention to facilitate the biaxial stretching of at least the neck of a parison.

Other objects and advantages of this invention will become apparent from the following description taken in conjunction with the accompanying drawings, wherein:

FIGS. 2 and 3 illustrate the impact molding process in which a parison is directly molded from the stretched material, FIG. 2 being a longitudinal sectional view showing the material which is about to be subjected to the molding operation, while FIG. 3 is a longitudinal sectional view showing the parison as molded;

Figure 6:
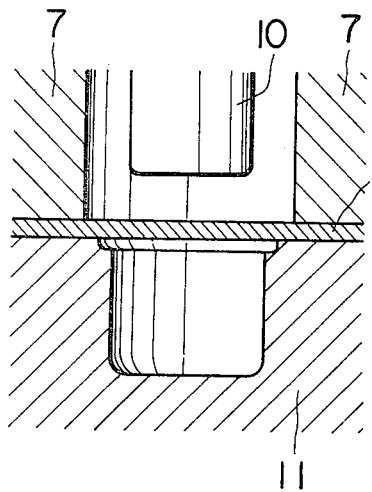
Figure 7:
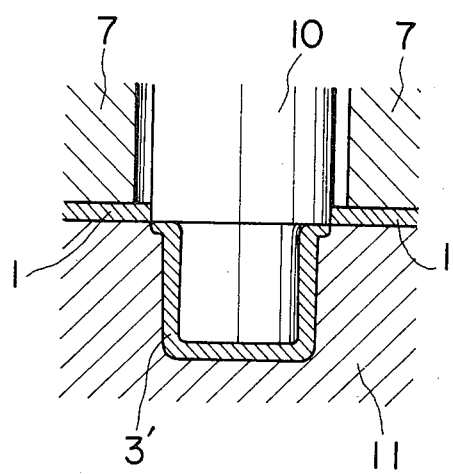
Figure 8:
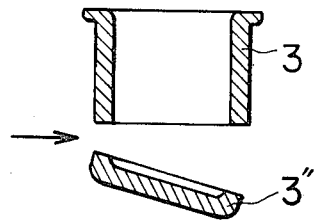

FIGS. 4 and 5 illustrate the vacuum molding process in which the parison is directly molded from the stretched material, FIG. 4 being a longitudinal sectional view showing the material which is about to be subjected to the molding operation, while FIG. 5 is a longitudinal sectional view showing the parison as molded; and FIGS. 6 through 10 illustrate a process in which a neck portion is first impact molded from a stretched material and is then used to injection mold a parison for a complete bottle, FIG. 6 being a longitudinal sectional view showing the material which is about to be molded into a basic shape of the neck portion, FIG. 7 being a longitudinal sectional view showing the basic shape of the neck portion as molded, FIG. 8 being a longitudinal sectional view showing the neck portion obtained by cuttong off the bottom of the basic shape, and FIG. 9 being a longitudinal sectional view showing the way in which the neck portion is mounted on a core, while FIG. 10 is a longitudinal sectional view illustrating the way in which the neck portion is used as a part of the mold for injection molding a parison.

This invention makes it possible to mold a bottle fully stretched in any part thereof by stretching the material for at least its neck portion when forming a parison, and stretching only its body portion when forming the parison into the bottle. The invention will now be described by way of example with reference to the accompanying drawings.

Figure 1:
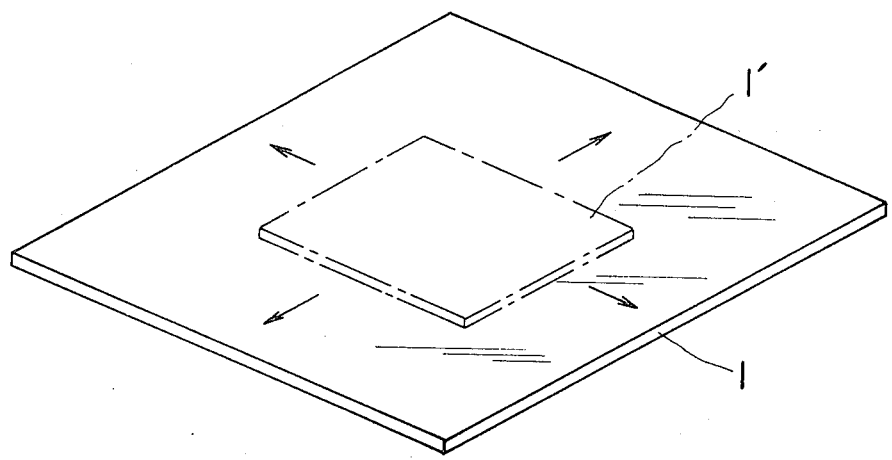
FIG. 1 is a perspective view of a material showing how it is stretched.

Referring to FIG. 1, a material 1' of polyethylene terephthalate in the form of a somewhat thick flat plate is heated to a temperature at which it can be stretched, and is biaxially stretched in four directions to form a stretched material 1. The stretched material 1 is heated again to a temperature at which it can further be stretched, and is stretched in an appropriate manner to form a cylindrical parison 2 having a closed bottom.

The most suitable method of stretch forming the stretched material 1 into the parison 2 is an impact or vacuum molding process.

Figure 2:
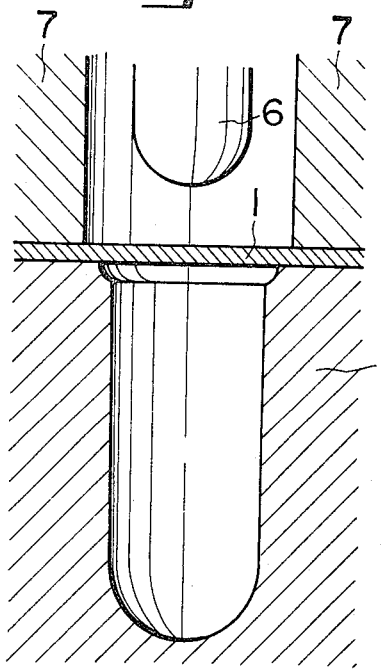
Figure 3:
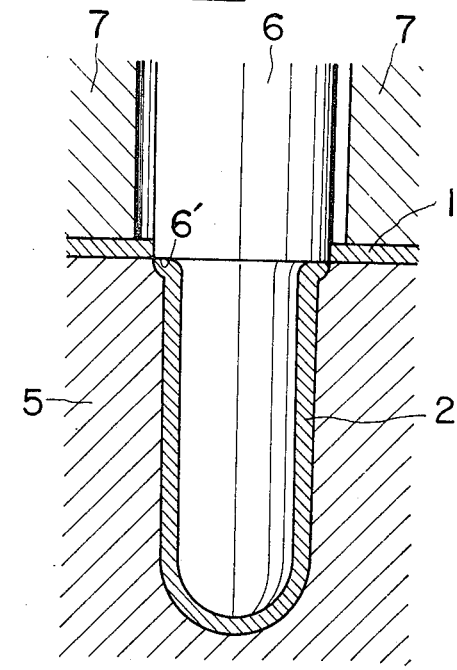

According to the impact molding process, which is illustrated in FIGS. 2 and 3, the stretched material 1 heated to a temperature at which it can be stretched is immovably retained on a metallic mold 5 by the metallic mold 5 and a retainer 7, and a core 6 is lowered to stretch the material and form it into the parison 2 between the metallic mold 5 and the core 6.

The core 6 is conveniently provided with a shoulder 6' to cut the parison 2 off the remainder of the stretched material 1 upon completion of the molding operation as shown in FIG. 3.

According to the vacuum molding process, which is illustrated in FIGS. 4 and 5, the stretched material 1 heated to a temperature at which it can be stretched is immovably retained on a metallic mold 8 by a retainer 7 in such a manner as to surround the periphery of the cavity of the mold 8, and the stretched material 1 is evacuated through a hole 9 at the bottom of the mold 8, whereby the material 1 is stretched under vacuum to form the parison 2.

According to the process of this invention in which the biaxially stretched material 1 is stretched to form the parison 2 as described above, therefore, the bottle blow molded from the parison 2 has every part thereof stretched to a satisfactory extent, and the excellent physical properties and durability of the polyethylene terephthalate from which the bottle is molded manifest themselves in any part of the bottle.

The molding operation is very easy to control at any stage of the process and can easily be performed without requiring any special equipment.

Attention is now directed to a process in which only a neck portion 3 is first molded from a stretched material 1 and a body portion is then molded to be joined with the neck portion 3 to thereby form a complete parison 2.

According to this embodiment, a cylindrical basic shape 3' of the neck portion 3 having a closed bottom is molded by exactly the same process as described with reference to the aforementioned embodiment. FIGS. 6 and 7 illustrate the impact molding of the basic shape 3'.

More specifically stated, a biaxially stretched material 1 is immovably supported on a metallic mold 11 by a retainer 7 as shown in FIG. 6, and then, a core 10 is lowered into a metallic mold 11 to form the basic shape 3' of the neck portion 3 between the core 10 and the mold 11 as shown in FIG. 7.

The basic shape 3' thus formed is disengaged from the core 10, and has a cylindrical shape having a closed bottom portion 3", which is in turn cut off from the basic shape 3', whereby the neck portion 3 is formed (FIG. 8).

The neck portion 3 thus formed is inserted over a core 12 in an injection molding machine until it reaches the base end of the core 12. A mold 13 is then placed about the core 12 to define a molding cavity with the core 12 and the neck portion 3 held therebetween in the injection molding machine. Upon such closure of the mold with the neck portion 3 serving as a part of the mold, molten polyethylene terephthalate is injected into the cavity through a gate 14 to form a body portion 4 which is joined to the neck portion 3 to define a parison 2 together.

As the neck portion 3 and the body portion 4 of the parison 2 are of the same resin, i.e., polyethylene terephthalate, they are united integrally with each other by fusion simultaneously with the molding of the body portion 4, and the fusion of the two portions 3 and 4 is so strong as if the parison 2 were a unitary one.

As the neck portion 3 is formed by impact molding or otherwise from the biaxially stretched material 1, it is fully stretched and can fully manifest the effect of stretching of the polyethylene terephthalate material.

It will be obvious from the foregoing description that according to this invention, the molding of at least the neck portion of a parison 2 from a preliminarily biaxially stretched material provides the neck of a bottle with the same excellent physical properties and durability as those of its body, even if the neck portion of the parison forms the neck of the bottle without being biaxially stretched again when the parison 2 is biaxially stretched and blow molded into the bottle, so that every part of the bottle formed can uniformly manifest the superior physical properties and durability of the polyethylene terephthalate from which it has been molded.

Moreover, the process of this invention can advantageously be carried out by using any conventionally existing apparatus and molding technique, and making the full use of the skill and experience already acquired.

What is claimed is:

1. A process for molding a parison for making a stretch molded bottle, comprising heating a material of a saturated polyester resin, particularly polyethylene terephthalate, in the form of a relatively thick flat plate to a temperature at which said material may be biaxially stretched, stretching said material biaxially in four directions to form a stretched material, heating said stretched material again to a temperature at which said material may be biaxially stretched, impact or vacuum molding said stretched material into a short cylindrically shaped, closed bottomed article having a neck portion and a bottom portion, removing said bottom of said article, inserting said neck portion over the base portion of a core, placing about said core and neck portion a mold to define a mold cavity, and molding within said cavity a cylindrically shaped body portion having a closed bottom from the same resinous material as that of which said neck portion is made, said body portion having an inside diameter equal to the inside diameter of said neck portion and being integrally united with said neck portion to form a parison.

2. A process for making a biaxially stretch molded bottle, comprising heating a material of a saturated polyester resin, particularly polyethylene terephthalate, in the form of a relatively thick flat plate to a temperature at which said material may be biaxially stretched, stretching said material biaxially in four directions to form a stretched material, heating said stretched material again to a temperature at which said material may be biaxially stretched, impact or vacuum molding said stretched material into a short cylindrically shaped, closed bottom article having a neck portion and a bottom portion, removing said bottom of said article, inserting said neck portion over the base portion of a core, placing about said core and neck portion a mold to define a mold cavity, and molding within said cavity a cylindrically shaped body portion having a closed bottom from the same resinous material as that of which said neck portion is made, said body portion having an inside diameter equal to the inside diameter of said neck portion and being integrally united with said neck portion to form a parison, placing said parison in a blow mold, heating said parison to a temperature at which said parison may be biaxially stretched, and blow molding said heated parison into a bottle.

* * * * *